(12) United States Patent
Alessi et al.

(10) Patent No.: US 10,679,504 B2
(45) Date of Patent: Jun. 9, 2020

(54) APPLICATIONS OF A PLURALITY OF SAFETY LASER SCANNERS COMBINED WITH A CAMERA OR MOBILE COMPUTER

(71) Applicant: Datalogic IP Tech S.r.l., Lippo di Calderara di Reno (IT)

(72) Inventors: Nicola Alessi, Bologna (IT); Enrico Lorenzoni, Zola Predosa (IT); Paolo Zanetta, Zola Predosa (IT); Lorenzo Girotti, Bologna (IT); Luca Pattini, Bologna (IT)

(73) Assignee: DATALOGIC IP TECH S.R.L., Lippo di Calderera di Reno, BO ( * ) Notice: Subject to any disclaimer, the term of this patent is extended or adjusted under 35 U.S.C. 154(b) by 235 days.

(21) Appl. No.: 15/820,162

(22) Filed: Nov. 21, 2017

(65) Prior Publication Data

US 2018/0144638 A1    May 24, 2018

Related U.S. Application Data

(60) Provisional application No. 62/424,776, filed on Nov. 21, 2016.

(51) Int. Cl.
| | |
|---|---|
| G08G 1/16 | (2006.01) |
| H04N 5/33 | (2006.01) |
| G05D 1/02 | (2020.01) |
| B60Q 5/00 | (2006.01) |
| B60Q 1/26 | (2006.01) |
| G05D 1/00 | (2006.01) |
| B60Q 1/52 | (2006.01) |
| G06K 9/00 | (2006.01) |

(52) U.S. Cl.
CPC ............... *G08G 1/166* (2013.01); *B60Q 1/26* (2013.01); *B60Q 1/525* (2013.01); *B60Q 5/006* (2013.01); *G05D 1/0088* (2013.01); *G05D 1/0214* (2013.01); *H04N 5/33* (2013.01); *G05D 2201/0216* (2013.01); *G06K 9/00671* (2013.01)

(58) Field of Classification Search
None
See application file for complete search history.

(56) References Cited

U.S. PATENT DOCUMENTS

| | | | | |
|---|---|---|---|---|
| 9,046,591 | B1* | 6/2015 | Yang | G01S 3/00 |
| 10,445,896 | B1* | 10/2019 | Bills | G01S 17/42 |
| 2014/0184794 | A1 | 3/2014 | Coombs et al. | |
| 2016/0155306 | A1 | 6/2016 | Kawanaka et al. | |
| 2016/0163171 | A1 | 6/2016 | Yamazaki et al. | |

FOREIGN PATENT DOCUMENTS

DE          202007000327         1/2007

* cited by examiner

*Primary Examiner* — Richard M Camby
(74) *Attorney, Agent, or Firm* — Shook, Hardy & Bacon L.L.C.

(57) ABSTRACT

Various embodiments of the invention are implemented with a mobile camera and safety laser scanner. A mobile computer can be used to show a visible infrared beam on the display of the mobile computer. The mobile computer can function as a safety tool to identify regions or locations where a laser beam might penetrate. The mobile computer can determine if the laser beam has penetrated a safety region or zone. Sensors can be used to determine when a laser beam may become dangerously close to an operator, especially with the use of automated guided vehicle that is moving around and has a scanning laser.

20 Claims, 8 Drawing Sheets

APPLICATIONS OF A PLURALITY OF SAFETY LASER SCANNERS COMBINED WITH A CAMERA OR MOBILE COMPUTER

CROSS-REFERENCE TO RELATED APPLICATIONS

This application claims priority to U.S. Application No. 62/424,776, filed Nov. 21, 2016, entitled "Novel Applications Of A Plurality Of Safety Laser Scanners Combined With A Camera Or Mobile Computer," which is incorporated in its entirety by reference herein.

BACKGROUND OF THE INVENTION

The combined use of a Safety Laser Scanner (SLS) with a camera or a Mobile Computer or tablet (MC) is disclosed in: German Patent DE 20 2007 000 327 U1, where camera is used to detect the orientation of the zone protected by the SLS; United Kingdom Patent GB 2 323 236, where cameras viewing different zones of the monitored area are switched selectively; U.S. Publication No. 20160155306, where a detachable, cabled display is provided to a SLS; U.S. Publication No. 20160163171, where a reduced resolution check image is shown on the SLS display, generated by a built-in camera; and U.S. Publication No. 20140184794_A1, where a tablet is used as a separate monitor for several wirelessly connected industrial devices.

BRIEF SUMMARY OF THE INVENTION

Several novel applications are disclosed herein, related to uses of Safety Laser Scanners in combination with cameras and Mobile computers, especially for automatic navigation systems. In some embodiments, automated guided vehicle (AGV) systems are collaborating with external sensors to expand their capabilities.

It is a general purpose of this disclosure to list all the potential new applications made possible by a more integrated system using a combination of a plurality of SLS, cameras and Mobile Computers in the AGV field, and in general in the industrial safety application field.

DETAILED DESCRIPTION OF THE INVENTION

Invention No. 1

Methods for increasing awareness of potential risks for humans moving in an industrial environment where moving AGVs and operating machines are present.

There are several applications of AR (augmented reality) in the field of consumer and military applications. Our proposal is to use AR glasses (Google glasses or other form of wearable head-up display (HUDs)) that might project information generated by SLS on the approach of a dangerous object. For example, the operator receives via a wireless receiver mounted on AR glasses a wireless signal from a wireless transmitter mounted on a SLS (either fixed or mounted on an AGV), which triggers a visual and audible warning that an object has entered a potentially dangerous path and may receive wirelessly from a camera an image of the approaching object, projected on the glasses' field of view.

Invention No. 2

One alternate way to exploit AR would be to use either an integrated display on the SLS, like in U.S. Publication No. 20160155306, or a wireless connected tablet, to project the camera image on a profile of the area monitored by the scanner, to better identify intruding objects. In this case the camera would be integrated in the SLS and have a field of view aligned with that of the SLS. The SLS display or the tablet display would show a graphic profile of the monitored area, generated by scanner data, superimposed on a camera view. In case a plurality of safety devices, such as plural SLS and/or safety light curtains are used, an alternate approach would be to use the camera integrated in the tablet to show a live image of the area, and wirelessly send to the tablet position data of the protected/monitored area by each SLS/curtain in a common reference system of the tablet, to generate the AR view on the tablet display. This would help an operator moving around in an area where several infrared (invisible) light beams are present to have a real time feedback of the overall status of protection of the area viewed on the tablet/MC screen. AR could also be used in AGV applications to give the user a dynamic visual feedback of the protected area of the moving vehicle/robot. Real time monitoring could be eased by the methods of invention Nos. 1 and 2.

Invention No. 3—Use of Indoor Localization.

One problem when using a tablet as a remote monitor in an industrial environment is the automatic selection of the data to propose to the user, avoiding on one hand too many data, and at the same time reducing the need to manually select the sensors to connect to for data download; one other problem is that old (not smart) sensors may not be necessarily networked, either wired or wirelessly. One solution is that you could bring the tablet close to a machine where there are several sensors that are not networked together, but they are fed (meaning they are powered) and have a short range transmission device; instead of disassembling the sensor to detect what is wrong when a malfunction is signaled by the customer, the technician approaches and the sensor transmits its serial number, the state of its outputs, maybe (in the case of a light barrier) a log of the last event registered, its supply voltage, the status of the LEDs (if they are not visible) and the corresponding error message, which is not always understandable by the plant operator, who is just the end customer. This would need a Bluetooth (BT) or Near-Field Communication (NFC) transmitter. The indoor localization would come into play for the fact that the maintainer walking through the facility locates a sensor (not visible) without having the machine layout, and can receive its state log. This method replaces debugging the machine with the wiring diagram, figuring out where the sensor is, physically connecting to it or unmounting it and testing it, and communicating the detected values.

Where necessary, proximity could trigger AR visualization as in Invention Nos. 1 and 2, e.g. when you approach, the tablet will have appear on the screen sensors that are in the area, maybe colored on the video (green operation OK, red sensor detects a malfunction), perhaps with a scroll that shows its status transmitted wirelessly, for example for technical support purposes.

Invention No. 4

We may take advantage of the inherent feature of almost all MC to perform indoor localization using Bluetooth Low Energy (BLE) or Radio Frequency Identification (RFID) or other techniques (the i-beacon feature easily lends itself to be implemented in an industrial environment, but other methods like RFID tags transmitting position, or other triangulation methods can be adapted and are widely known for positioning a MC in an indoor environment such as a store or warehouse). We can use indoor localization (for example, BLE) in this way: you have a tablet with an indoor localization system and a number of scattered sensors for the plant (here, contrary to Invention No. 3, none of the sensors has any capability to transmit its position by itself); the tablet can store a plan of the plant, so that when you approach the tablet to the sensors will appear on the screen sensors that are in the area, and the operator can physically inspect them.

Invention No. 5

Correct orientation is an issue for SLS, where the exact orientation of the scanning plane may affect both precision and extent of the monitored area. Although correct orientation is established during installation, it may be affected with time by vibrations, shocks, etc. The SLS could be provided with a bay/dock for the tablet. All tablet nowadays have an accelerometer/inclinometer. The stored orientation parameters (during installation) could be transferred either by contacts in the dock/bay or wirelessly from the SLS to the tablet, which performs runtime a check that the correct SLS orientation has been maintained. In this way the service operator may use one single device to inspect a multi-device system.

Invention No. 6—CAD to SLS Topology

During configuration, one usually connects the one or more SLS to an external personal computer (PC), in order to graphically design the area and correctly place different devices and existing constraints. This is necessary to make sure the monitored/protected area is properly covered (possibly with redundancy) by the available devices, and the existing constraints (walls, pillars, working areas, . . . ) are taken into account. Existing systems use rather simple approaches with limited graphical capabilities, and are constrained to an external PC. The improvement we propose is:
1) To have a "CAD import" feature, called "CAD to SLS" that allows to import a full 2D-3D CAD model into the configuration GUI; known products, such as Sick μScan 3, just allow to load a BMP/JPEG image (possibly the image of a technical drawing) and superimpose one single SLS device on it, and draw the monitored area on it. With our solution, there would be the possibility of a full design interaction between the CAD model of the plant and the SLS, automatically taking into account physical constraints;
2) This interactive CAD design feature could be loaded on the tablet, so that interactive design can be performed on site, looking at the real area in plant or side (2D) or perspective (3D), taking advantage of the AR features previously disclosed.

The general concept of SLS configuration topologies is described in the Italian patent application IT/MI 102016000070878, filed on Jul. 7, 2016.

Invention No. 7—Short Range Communication

The idea of short-range communication (NFC for example) for transferring configuration data between mobile devices is well known. However, in the field of industrial sensors, and SLS in particular, it can be expanded to the use of NFC to configure at production line level. Approaching an MC to the products to be configured and perform device cloning without switching them is possible by using an active NFC/RFID transmitter on the MC and a passive NFC tag or RFID tag on the sensor (you can use a higher power to power the passive tag). Approaching the MC changes graphical user interface (GUI) according to the specific sensor approached. For example, if I get close to a Matrix 120 Imager you configure the GUI for the Matrix, if I approach an SLS, a different GUI is shown. NFC on very small Sensor products can serve to make debug or reset (standard configuration reloading) in those cases where there is not even space for a Joint Test Action Group (JTAG) debugger.

Invention No. 8—MC as a SLS Scan Line (IR) Viewer

Figure 1:
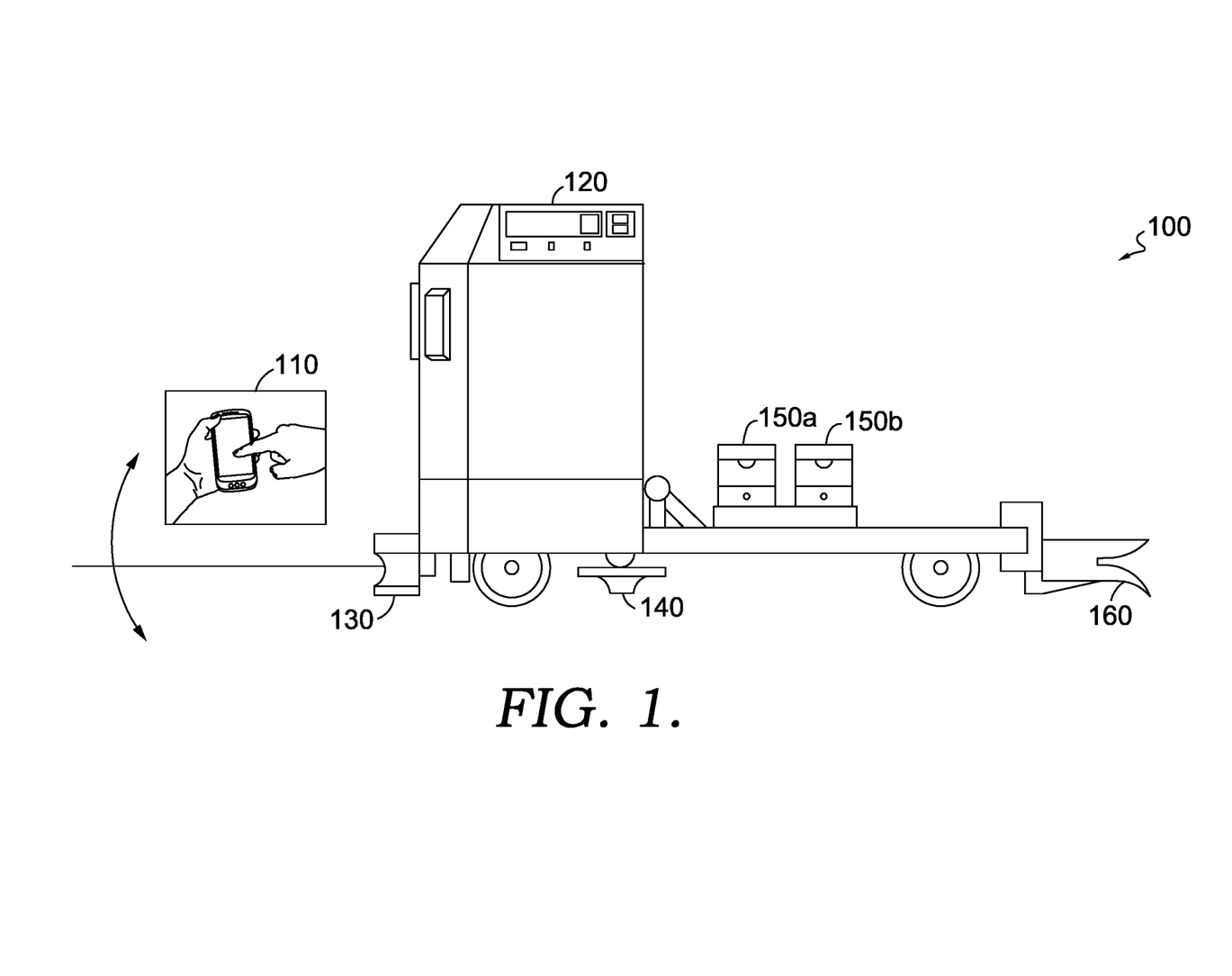
FIG. 1 illustrates an exemplary system using a mobile computer as a safety laser scanner, in an implementation of an embodiment of the invention.

Another way to exploit a combined use of a SLS with a MC is shown in FIG. 1 in system 100. In FIG. 1, a MC 110 is shown that monitors the system 100. System 100 includes an operator interface 120, a laser safety bumper 130, an auto charging collector 140, battery sets 150a and 150b, and an auto hitch assembly 160.

Without IR (infrared) filters on an Image Sensor, a Camera can become a IR viewer, so the scanning beam of the SLS (IR with wavelength @ 905 nm) can become clearly visible if the acquired image can be displayed on a screen. MC 100 with a good size (5 inch) and high-resolution display and a camera without IR filters could help the installation (in particular for checking any Skew angle that is also strictly regulated by Safety Rules). So, the idea is to use MC 100 as a viewer of the IR beam during installation and operation, to check the beam is properly aligned.

Figure 2:
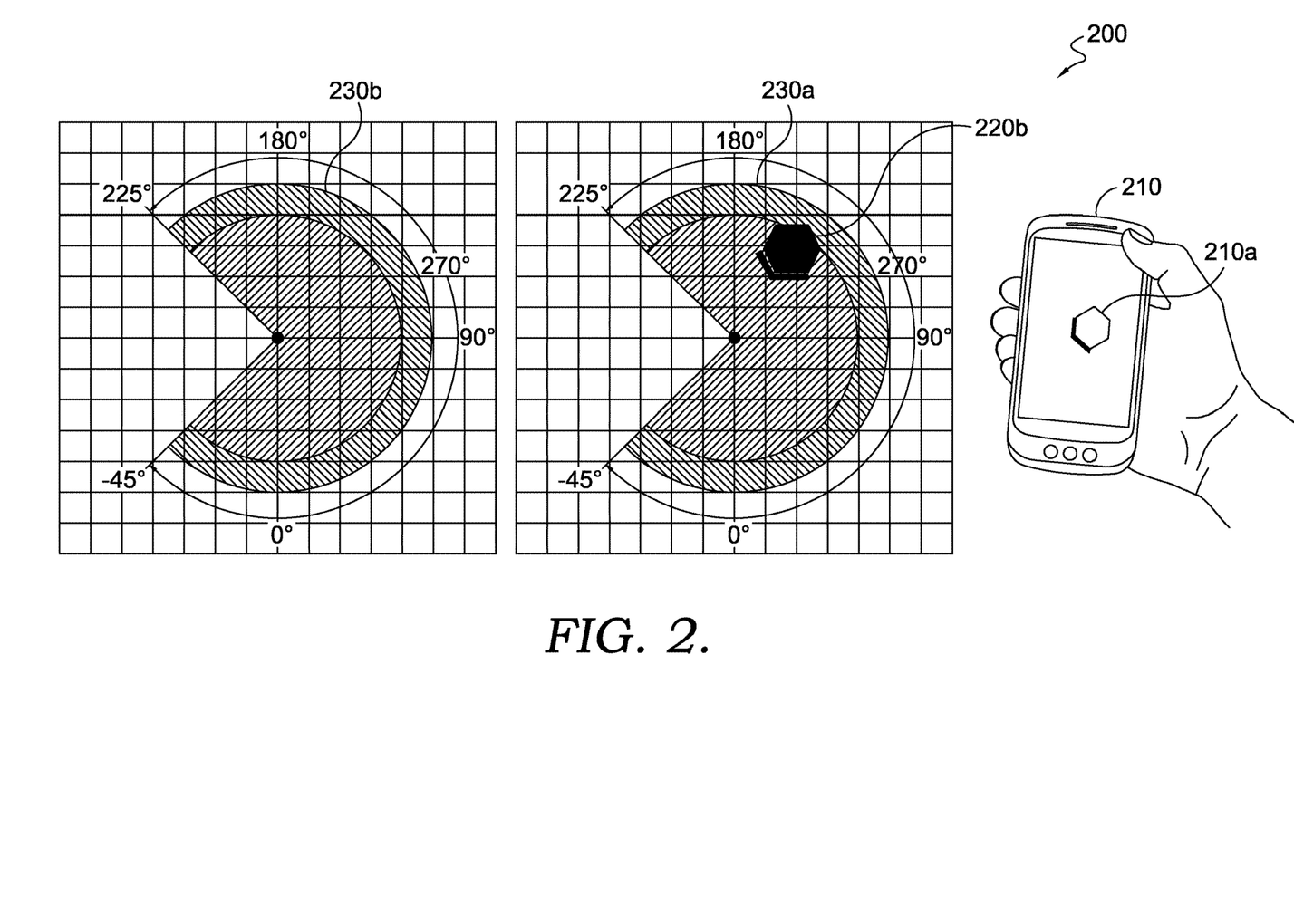
FIG. 2 illustrates an exemplary system of a mobile computer displaying a laser beam that has penetrated a safety region, in an implementation of an embodiment of the invention.

Another application is using the MC as a gunsight viewer for a violating object penetrating the monitored/protected area, as shown in FIG. 2. FIG. 2 shows system 200 with a MC 210. MC 210 displays a laser beam image 220a, which corresponds to a laser beam 220b in a safety region 230a. A safety region 230b is shown with no laser beam penetrating the region.

The SLS, after a safety region violation made by a static event, can switch off the laser light 220a everywhere except for the angles where the object intruding the safety region 230a, making it easy for the operator to recognize it using a mobile viewer (MC 210 with camera and display) and take pictures.

MC 210 with a good size (~5 inch) and high-resolution display and a camera without IR filters can do the job.

Invention No. 9—Tool for Safety Certificate Verification

The SLS/Cluster configuration must be all the time carefully checked by the Plant Safety Supervisor. He should go through all the SLS/Cluster parameters and check that they are coherent with the Plant Safety Project he made. To make this he needs to go around the monitored area and make personally many checks requested by the Safety Regulations. For instance, to check the correctness of the Safety Regions, he has to verify all of them, considering all the possible zones configurations, handling a test pieces, and verifying what is programmed is coherent with what is expected. This can become difficult without having a PC with a GUI running («where am I verifying now and what?»): sometime two people interacting are needed).

Figure 3:
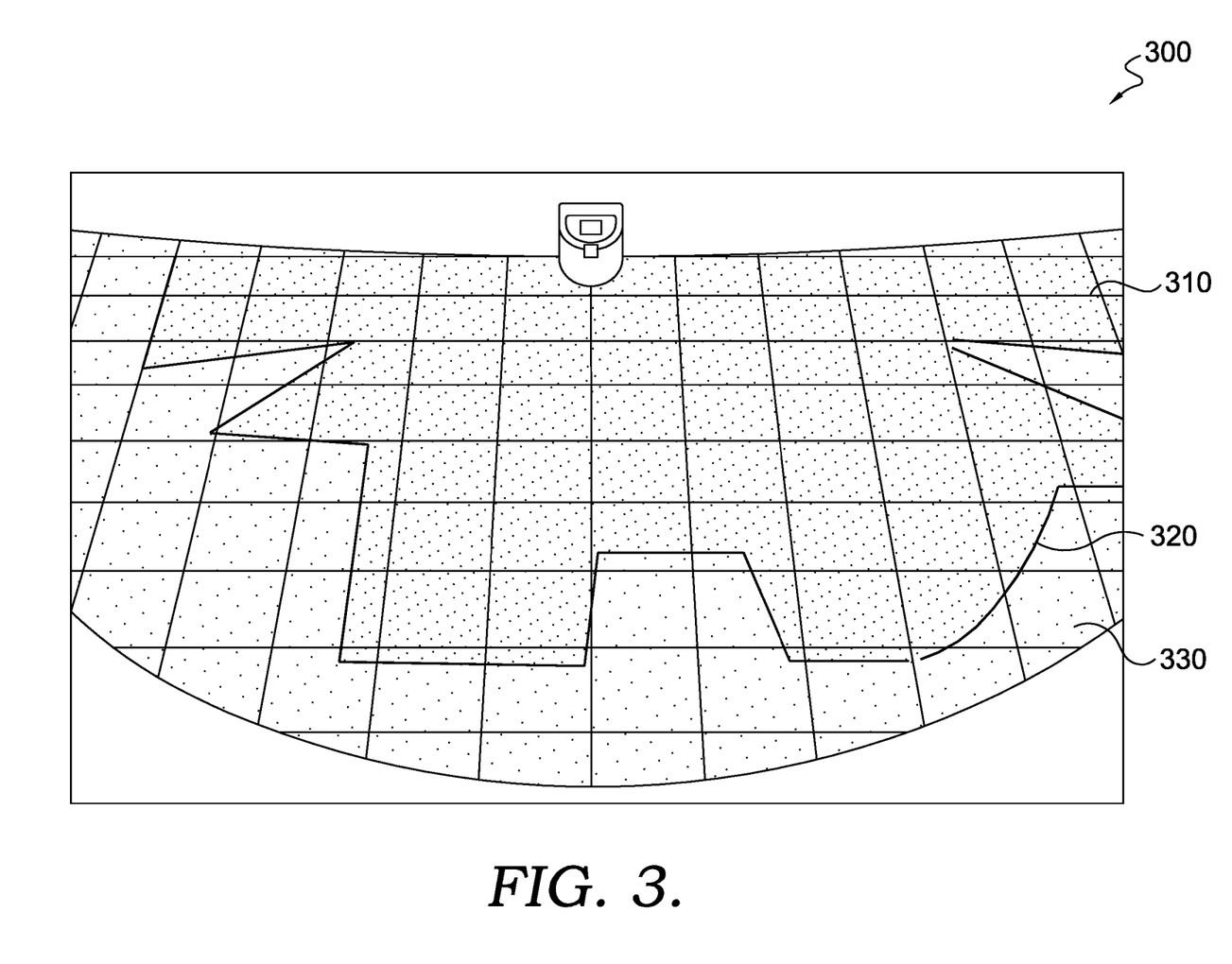
FIG. 3 illustrates an exemplary display of a safety region and a laser beam on a mobile computer, in an implementation of an embodiment of the invention.

In FIG. 3, an illustration 300 shows a safety region 310 that is available for an operator or worker to use. Illustration 300 also shows a boundary 320 of the safety region 310 and shows an outside region 330, which is an area beyond the safety region.

Figure 4:
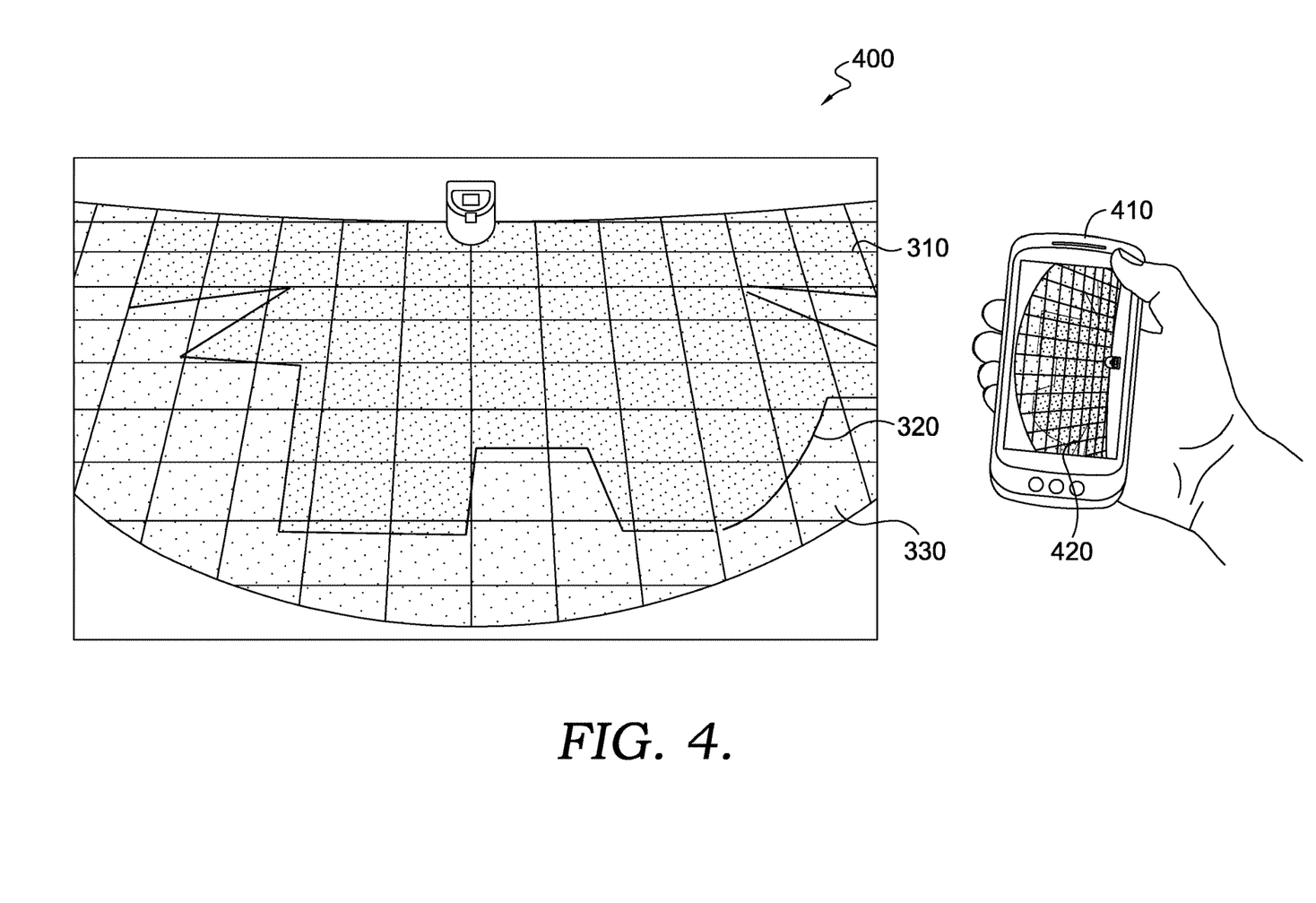
FIG. 4 illustrates another exemplary display of a safety region and a laser beam on a mobile computer, in an implementation of an embodiment of the invention.

FIG. 4 shows an illustration 400 with a similar depiction of safety region 310, boundary 320, and outside region 330. However, a mobile computer 410 can display an illustration of the regions and boundary on its display at 420. When a user moves mobile computer 410 around, different portions of safety region 310, boundary 320, and outside region 330 can be shown at 420. Mobile computer 410 can show a visible laser beam (not shown) that penetrates safety region 310.

MC 410 can be a useful aid for the Safety Region verification: The SLS/Cluster (operating in a kind of a verification mode) can transmit to MC 410 the information about where it detects the test piece is placed by the operator at any given time (through a WiFi connection). It's possible to see on display 420 where the test piece is placed with respect to the safety region edge 320 (zooming in automatically), and this, together with the status of the safety region 310 (violated or free) on MC 410 makes it easier this check.

Invention No. 10—Management of Shadowed Areas when Objects Travel Along Shadowed/Hidden Trajectories In all those cases where an operator is approaching the path of an AGV from a hidden/shadowed/obstructed area, the operator could enter the actual field of view (FOV) of the scanner too late for an effective corrective action (stop/deviate/slow down). It would be desirable to allow an AGV to either be pre-alerted of the potential forthcoming appearance of a hidden obstacle in its path, or an operator being alerted of his risk to collide with an AGV which is not visible yet, as his current trajectory or route is a potentially dangerous one.

A plurality of sensors is provided at fixed and remote positions inside the building; each sensor monitors a hidden area, such as corners, doors, side shelves, aisles or pillars, etc. Each sensor protects one of such areas where an operator could pass; the sensor is wirelessly connected to the AGV and, upon the AGV entering a certain range close to the hidden area, the two are connected, so that the fixed sensor becomes an additional "eye" of the AGV. The wireless system activates communication between the AGV and the fixed sensor only when Received Signal Strength Indication (RSSI) exceeds a predetermined threshold.

The external, fixed sensor, performs one or more actions upon detecting an intruder in its monitored area:
1) Issue a warning message to the AGV, possibly including a position of the intruder in an absolute reference system, thus allowing the AGV to take a decision about deceleration, change of trajectory, or whatever;
2) Evaluate the intruder's trajectory and assess if it is a potential collision path or not, then decide whether to issue a warning to the AGV or not;
3) Issue a warning to the intruder, provided the intruder is equipped with a wireless device, such as a Mobile Computer, a pager, or another alarm device; an acoustic or visual warning/alarm can also or alternatively be issued; (if the intruder is non-human, it is just sufficient for it to be also wirelessly connected to the fixed sensor).

The prior art is focused on AGVs having on-board sensors. Chinese Patent CN103278170B discloses the use of external sensors to create a map of the area, to be transmitted to a robot, so that a map is stored in the robot's memory; the map looks static and not dynamically updated, however, so the robot cannot detect dynamically changing obstacles. Chinese Patent CN103558856A discloses a system for helping a robot to adapt its behavior to avoid moving obstacles, comprising hidden ones, by using a mix of a SLS mounted on the robot and a plurality of cameras, sending information to the robot via a wireless link. The robot uses this information to adapt its approach trajectories to avoid hurting people.

However, the invention is not a navigation (NAV) system, and it does not need to store a map of the environment in the AGV; it is proximity to the fixed sensor that triggers the additional safety function. The '856 robot system evaluates human trajectories with respect of a stored map of the environment. There is no association of humans with zones marked as "hidden zones", nor a specific placement of fixed cameras/sensors in zones that are hidden to the SLS mounted on the AGV. All the humans are monitored and their trajectories estimated. There is no warning, but only change of trajectory.

Invention No. 11—Hybrid 3D Safety with SLS

The use of 2D cameras for safety applications has limitations due to the difficult calibration of distance measurements. However, the possibility to integrate laser monitoring with image analysis would add new possibility in the evaluation of safety events, adding a higher degree of discrimination between safe intrusions, intrusions generating a warning, and dangerous intrusion generating a stop/alarm.

The combination of a 3D camera and a SLS would achieve an advantageous synergy, in that a 3D camera has an intrinsic distance measurement capability and image analysis capability, but is not as fast and accurate in distance measurement as a SLS. The combined use of SLS and 3D, with overlapping fields, would lead to a Vision Safety System, where classes of intrusions can be defined and managed in a more sophisticated way.

U.S. Publication No. 20120123563A1 discloses the combined use of laser scanner and 2D/3D cameras with overlapping fields, and a control unit capable of differently mixing their output based on different criteria. This is the closest prior art. European Patent Office patent EP2282016B1 discloses a weight, color, contour or size access detector placed at the entrance of a monitored area, a second RFID sensor unit to detect the number of people entering a monitored area, and a first sensor (possibly a stereocamera) to monitor a working area internal to the accessed room, the first sensor working also based on characteristic features communicated by the first sensor and the access detector. The specific combined and integrated use of a 3D camera and a SLS is not disclosed. European Patent Office patent EP3026459 discloses the combined use of a SLS and a TOF camera, connected by a safety link, mounted on a vehicle and cooperatively working to detect obstacles and issue warnings and/or stop or divert the vehicle motion.

The specific use of a 3D camera to complement a SLS in monitoring the type and identity of intruder objects, and thus trigger different safety zone configurations or actions is not disclosed in these documents. In particular, the 3D camera would not be per se, a safety device, but could integrate the safety operation of the SLS by generating a plurality of additional warning messages (in a SLS application, the warning condition is preliminary to the safety condition, and thus it doesn't need to be generated by a certified safety device).

Examples could be:

3D camera performs analysis of the 3D volume in front of the SLS and issues a warning the SLS uses to:

a. Activate a warning zone, larger than the actual protection zone;
b. Analyze object type/class/trajectory;
c. Generate audible warning to intruder;
d. Slow down AGV, or, if object is slow moving, just correct AGV trajectory keeping speed constant in order to avoid contact.

The advantage is to reduce the number of practical situation when a protection alarm is generated in situations where this could be avoided.

SLS is equipped with a motorized gimbal mount to perform 3D laser scanning, slice by slice. The 3D camera field of view and the 3D SLS field of view are superimposed. The 3D camera can perform faster image analysis and add predictive analysis. This presumably reduces if not eliminates the need of external reference/calibration objects for AGV navigation. In this configuration, only a reduced number of measurement planes (1D) could be safety certified.

Invention No. 12—Combined SLS/NAV System

Reduce the number of sensors mounted on an AGV. The practical implementation of an AGV system generally implies the use of two separate devices (one SLS for area protection and one SLS for vehicle guidance).

The gist of the invention however, is having an integrated device performing the two functions. A single laser scanner cannot perform both functions at the same time.

A more realistic approach seems to be having a single device where the following are integrated:

1) A master unit comprising:
a. A safety laser scanner or a safety camera;
b. A navigation scanner or a navigation camera distinct from 1);
c. A single control unit receiving data from a) and b) and comprising navigation hardware (board) and software, AND safety software;
2) A plurality of (optional) external sensors (SLS, cameras, . . . ) connected as additional slaves, sending their data to the master unit via an I/O port on the master (or wirelessly).

Combined use of a camera integrally mounted on a SLS to realize a Navigation System (NAV). The current proposal by known products, such as Sick NAV is an additional device (separate from the SLS), which is substantially another SLS, equipped with a hardware board dedicated to AGV applications. The main concept is to have one single SLS device, capable of performing both functions, i.e. monitoring safety zones, AND recognizing the factory layout and potential obstacles. A downward oriented camera could be used for navigation, especially if stripes are painted on the floor, or reference 1D or 2D codes are placed on the walls to mark reference points of the map memorized in the device. The main SLS could be a master, and additional SLS and/or cameras could act as additional inputs to the master SLS/AGV.

Figure 5:
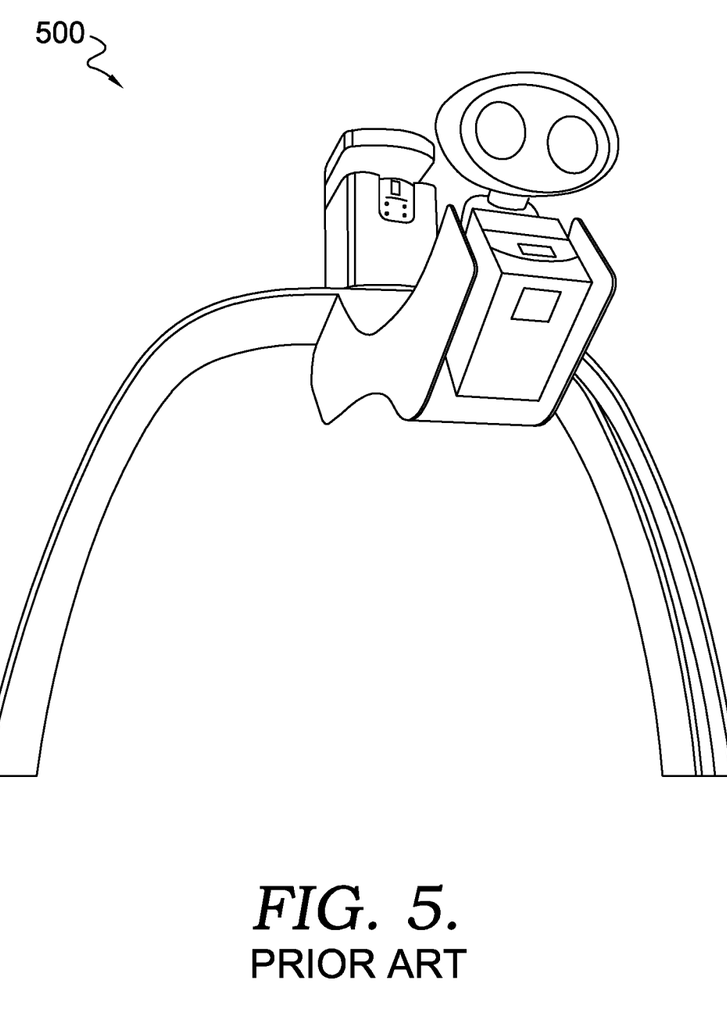
FIG. 5 illustrates a camera and a safety laser scanning system.

AGV boards are available on the market, and can be fed with the signal coming from a SLS, in order to convert it to an AGC system. Systems integrating a camera and a SLS have been on exhibition at LOGIMAT 2016. See FIG. 5.

U.S. Pat. No. 4,775,238A discloses a combined use of a scanner and a camera for web inspection, but not integrated into a same device. German Patent No. DE19757840 discloses a line scan camera integrally mounted with an array of TOF sensors, and pivoted along a direction vertical to the scanning plane. It also discloses a 2D camera combined with a pivotable distance sensor taking distances of single points in the camera field of view. European Patent Office No. EP3026459 discloses the combined use of a SLS and a TOF camera, connected by a safety link, mounted on a vehicle and cooperatively working to detect obstacles and issue warnings and/or stop or divert the vehicle motion.

The combined use of the two devices for navigation (i.e. loading a map, recognizing the vehicle position in an environment by detecting markers, and elaborating trajectories based on the loaded map and the detected markers) and obstacle recognition and avoidance is not disclosed in the prior art.

What is not anticipated by existing systems is:
a SLS integrating in the same housing a full navigation hardware and software AND an obstacle detection and avoidance system;
a navigation system based on a combined camera+SLS, where the camera is used to take images of the environment, and to detect orientation barcodes.
a combined system where a master SLS acts as a main SLS+AGV device, and one or more slave camera(s)/SLS provide additional input to the master for both navigation and safety purposes. This would allow using SLS as complementary AGV sensors.

Invention No. 13—Camera Assisted Configuration Backup/Restore/Copy

Using a camera, be it a conventional 2D or 3D, it is possible to store an image of the scene framing the working area of the SLS, in the SLS configuration file. This would make it possible an additional check during a fast replacement action. It would be possible to check consistency between the configuration we are storing and the area stored in the image, where the SLS is installed, or highlight inconsistencies between images quite different from the one stored in memory, to issue a warning if the same or a close set of safety areas is being configured for two scenes that appear to be different. This has a value for complex installations where stop time is expensive (automotive) and the short time available for device swap could lead to inadvertently load a worn configuration. It is an additional degree of redundancy.

Today we have at most an accelerometer that checks the correct XYZ; ro-theta-phi pose, but this is an incomplete set of data.

We could also store the configuration file+image remotely on a master SLS or on a remote PLC, so that it is no more necessary to have a memory box/stick in the "old" SLS that needs to be removed and swapped into the new one. The replaced SLS could take a picture, send it to a remote master/PLC, where the image is checked for consistency. The configuration present in the new SLS (if preloaded) is not allowed by the master/PLC if the image of the scene is not consistent with what expected. Alternatively if the new SLS (with a blank/standard configuration file preloaded) does not "see" the expected scene, the configuration of the "old" SLS associated with this replacement is not downloaded from the master/PLC, thus indicating that there is no consistency between the place where the new SLS is mounted and the place where the "old" SLS should have been replaced.

Invention No. 14

Camera could be used to read a barcode representing a full configuration file.

Invention No. 15

Camera could be not an integrated one, but just one of many sensors connected in a Master/slave topology as a slave.

Invention No. 16

Insert in the SLS+camera an additional pattern projector to project in the outside environment warnings or reference patterns.

Invention No. 17

Use camera mounted on SLS or on AGV (and connected to SLS in a master/slave configuration), as an aid to navigation, possibly using them to read locationing barcodes/2D codes baited/switched on walls of AGV passageways.

Invention No. 18

We could envisage some applications where SLS is not in a fixed position on the AGV (or is mounted in a fixed position, but on an adjustable moving support, possibly motorized and driven by the SLS itself or by an external PLC/Master device connected in a networked topology). The additional camera on the SLS analyzes the image and changes monitored areas or even reorients the SLS based on image analysis.

Invention No. 19

Use an e-ink display of large format (color or b/w), up to A3, to use as a substitute of a classic 5-7" MC display, with a wireless link to download complex A3 technical drawings of the whole plant. This is to solve the problem that today often operators still walk around the plant with bulky bunches of A3 technical drawings for every part of the complex machines.

Invention No. 20

On a Mobile Computer a GUI can run and provide to the user the possibility to: Modify or fine tune the SLS configuration (change some parameters, Safety Areas, etc.). To be effective a high quality GUI has to be designed for the MC (e.g. the CAD image of the Plant, top view, has to be displayed). Receive, display and check diagnostics coming from an operating SLS or Cluster of SLS. Have a portable, remote SLS display.

A Mobile Computer with a GUI can become the downloader of an existing offline configuration (built with a PC not connected to a Master/SLS) through a WiFi communication.

Invention No. 21

Figure 6:
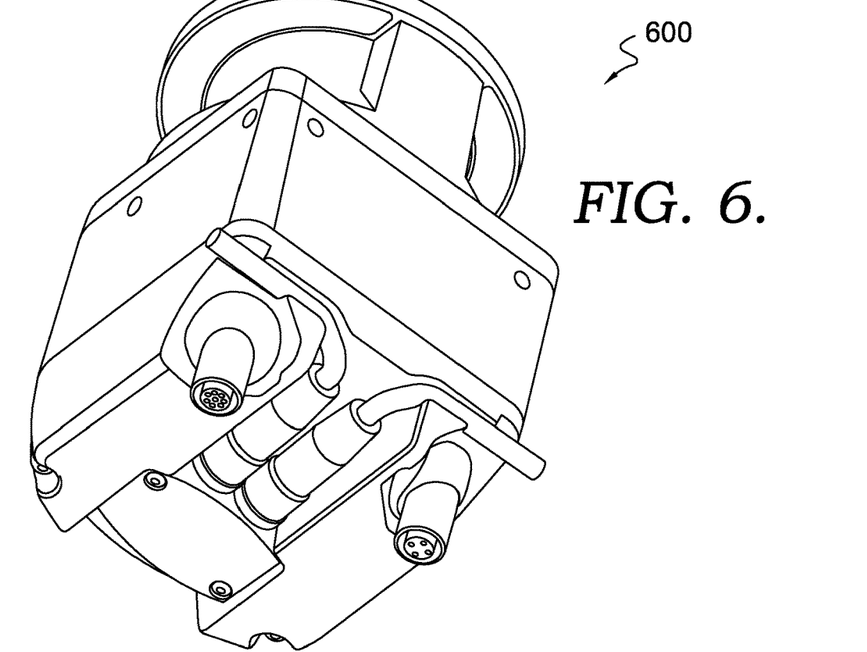
FIGS. 6 and 7 illustrate exemplary safety laser scanners.
Figure 7:
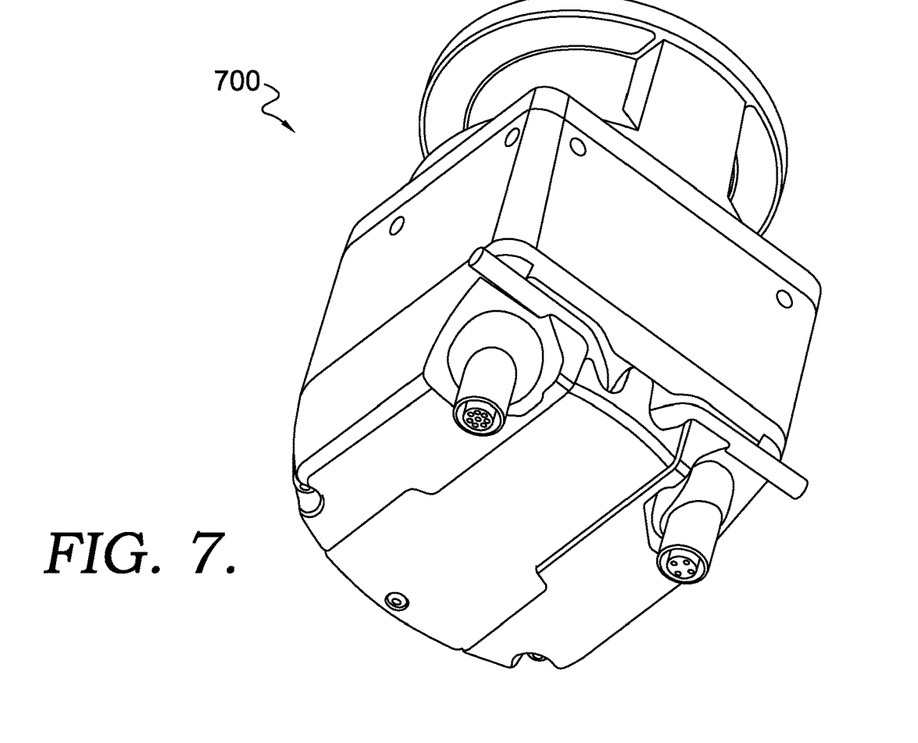

In reference to FIGS. 6 and 7, the SLS has an external memory module to store a backup copy of configuration parameters and other safety data. Generally, this is solved by using a SD card or similar removable memory stick. This has the risk that the during replacement or maintenance the memory stick is not mounted, so the SLS is inadvertently working with no backup. We have designed a removable memory block integral with connection cables that are mounted on the bottom part of the SLS. In this way, the scanner does not work if the memory block is not present. The memory/cable assembly is protected by a bottom cover. The bottom part of the SLS is shaped to guide cables to exit the device in the correct orientation, which means more robust to strain; cables are less prone to be an obstacle during mounting.

Invention No. 22

Figure 8:
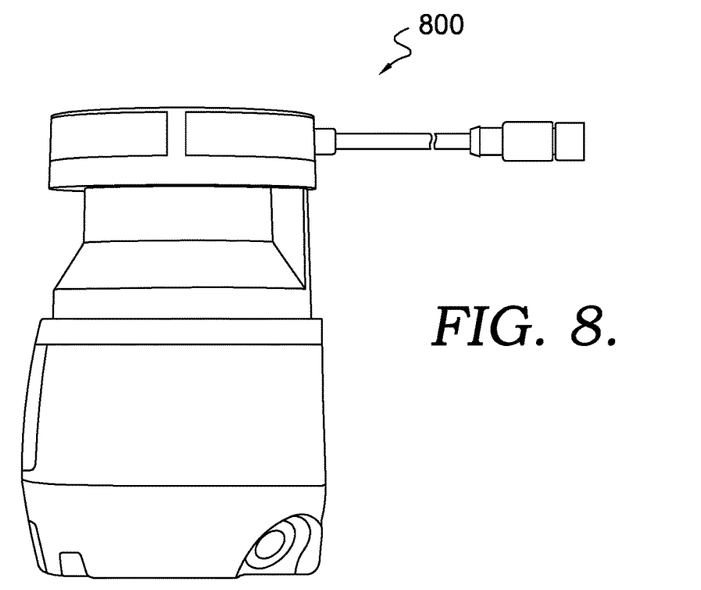
FIGS. 8, 9, and 10 illustrates various views of a combined camera (on top) and safety laser scanner.
Figure 9:
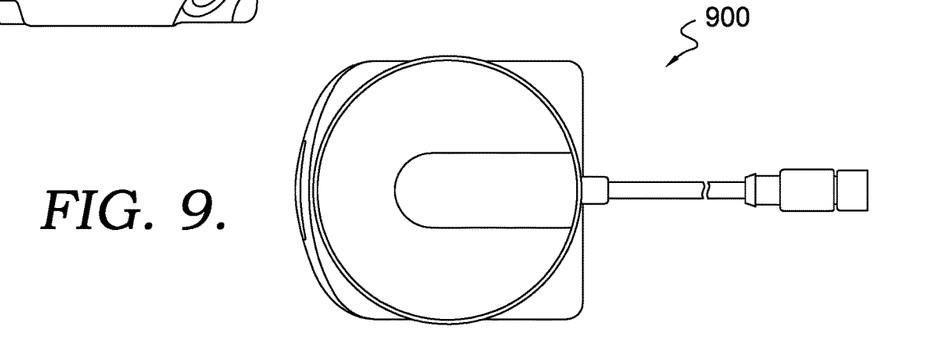
Figure 10:
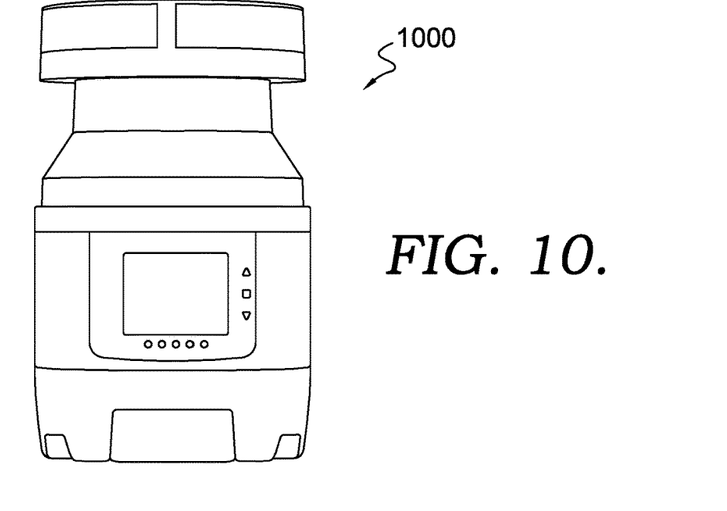
Figure 11:
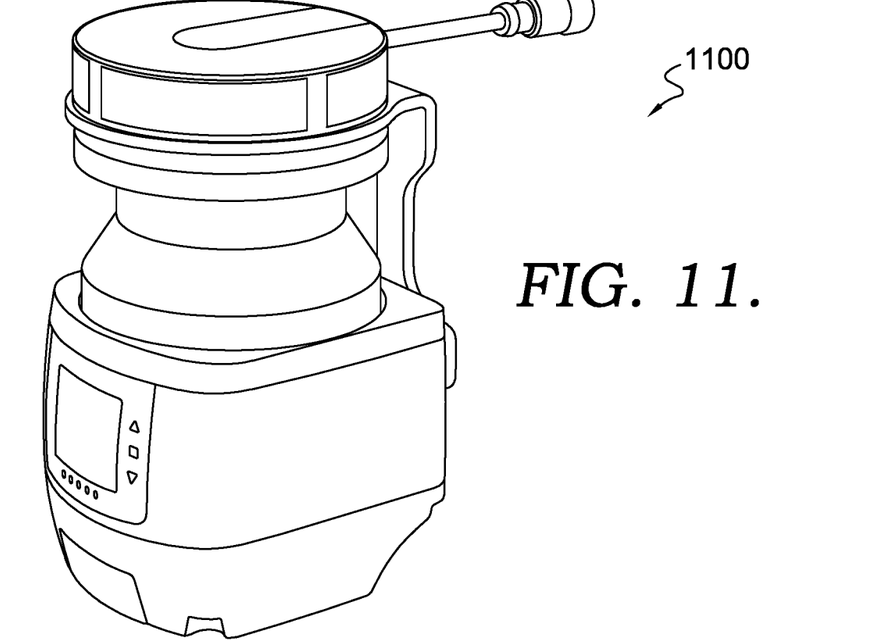
FIG. 11 illustrates a combined metal camera and safety laser scanner with the camera mounted on a protection bracket.
Figure 12:
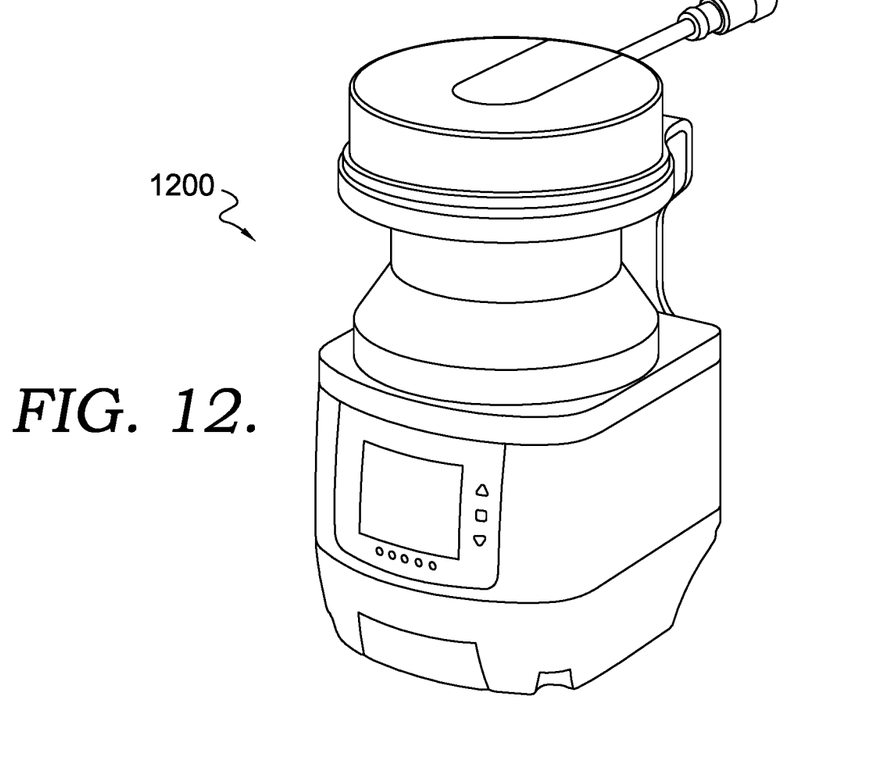
FIG. 12 illustrates a combined plastic camera and safety laser scanner with the camera mounted on a protection bracket.

In FIGS. 8, 9, and 10, design ideas for a combined camera (on top)+SLS is shown. Every window shows a different camera. In FIG. 11, a metal camera accessory is located on a protection bracket (Camera is not mounted directly on the SLS, but on the mounting bracket accessory). In FIG. 12, a plastic camera accessory is located on a protection bracket.

Having thus described the invention, what is claimed is:

1. A system for protecting an intruder from a scanning laser of an automated guided vehicle (AGV) that moves around a location, comprising:
   (a) a plurality of sensors are placed throughout the location, wherein a sensor of the plurality of sensors monitors a unique area within the location;
   (b) the sensor connects wirelessly to the AGV when the AGV enters a certain range close the unique area, wherein the sensor extends sensor capabilities to the AGV, wherein the AGV has the sensor capabilities so long as the Received Signal Strength Indication (RSSI) between the sensor and the AGV exceed a predetermined threshold, and wherein the AGV monitors its surrounding area while the sensor monitors the unique area while the sensor and the AGV are wirelessly connected;
   (c) the AGV disconnects from the sensor when the AGV moves away from the unique area and the RSSI falls below the predetermined threshold; and
   (d) the AGV moves and connects to another sensor in accordance with step (b).

2. The system of claim 1, further comprising the sensor issues a warning to the AGV when the intruder is in the unique area, wherein the AGV maneuvers to avoid the intruder.

3. The system of claim 2, wherein the AGV maneuvers comprises the AGV decelerates, changes a trajectory, or alters a route.

4. The system of claim 2, wherein the sensor sends a position of the intruder to the AGV.

5. The system of claim 2, further comprising the sensor evaluates a first motion trajectory of the intruder and a second motion trajectory of the AGV to calculate a potential collision path, wherein the sensor issues a warning to the AGV if the intruder and the AGV are on a collision path.

6. The system of claim 1, further comprising the sensor issues a warning to the intruder, provided the intruder is equipped with a device to receive the warning.

7. The system of claim 6, wherein the device is at least a mobile computer, a pager, or an alarm device that connects wirelessly to the sensor.

8. The system of claim 7, wherein the device provides at least an acoustic warning or visual warning to the intruder.

9. The system of claim 6, wherein the intruder is non-human and connects to the sensor wirelessly.

10. The system of claim 1, wherein the unique area is at least a hidden area, a corner, a door, an aisle, or a pillar.

11. The system of claim 1, wherein the plurality of sensors monitors the location where the intruder can pass.

12. The system of claim 1, wherein the plurality of sensors are safety laser scanners.

13. The system of claim 12, further comprising a 3D camera configured to perform a 3D volume analysis for an overlapping region of at least one of the safety laser scanners.

14. The system of claim 13, wherein the 3D camera is configured to perform a predictive analysis of the 3D volume.

15. The system of claim 13, wherein at least one safety laser scanner includes a motorized gimbal mount and is configured to perform 3D laser scanning to obtain 3D SLS data.

16. The system of claim 13, wherein at least one of the 3D camera or the safety laser scanner is configured to superimpose 3D camera data and the 3D SLS data.

17. The system of claim 12, further comprising a master safety laser scanner mounted on the AGV configured to communicate with the safety laser scanners placed throughout the location as slave devices.

18. The system of claim 17, wherein the master safety laser scanner integrates navigation hardware and software and an obstacle detection and avoidance system within a same housing.

19. The system of claim 17, wherein the navigation hardware and software includes a map stored in memory.

20. The system of claim 13, wherein the 3D camera is configured to perform barcode decoding.

* * * * *